United States Patent

(12) United States Patent
Weaver

(10) Patent No.: US 6,574,669 B1
(45) Date of Patent: Jun. 3, 2003

(54) METHOD AND APPARATUS FOR ROUTING TRAFFIC WITHIN A NETWORK UTILIZING LINEAR OPTIMIZATION

(75) Inventor: Jeffrey Charles Weaver, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/144,509

(22) Filed: Aug. 31, 1998

(51) Int. Cl.⁷ ............................................. G06F 13/00
(52) U.S. Cl. ..................... 709/239; 709/238; 370/252; 370/254; 370/255
(58) Field of Search ...................... 709/238–255, 709/232, 351, 400; 370/254–255, 232, 351, 252, 238, 400

(56) References Cited

U.S. PATENT DOCUMENTS 5,600,638 A * 2/1997 Bertin et al. ............. 370/351
5,600,794 A * 2/1997 Callon ..................... 709/201
5,999,517 A * 12/1999 Koning et al. ............ 370/255
6,061,331 A * 5/2000 Conway et al. ........... 370/232

* cited by examiner

Primary Examiner—Moustafa M. Meky
Assistant Examiner—Hien C. Le
(74) Attorney, Agent, or Firm—Blakely Sokoloff Taylor & Zafman LLP

(57) ABSTRACT

A method and an apparatus for routing packets within a computer network uses linear optimization techniques to distribute the packet traffic over all potential links between a source and a destination node within the network. Network traffic is allocated to links coupled to a source node in a manner that is proportional to the bandwidth of links across complete paths which are fed from such links coupled to the source node. A set of metrics, in the form of complex numbers, is determined for a predetermined set of links within the network. The metrics are arranged as a matrix, and a linear optimization operation is performed using the matrix to determine percentage traffic distribution over links coupling the source node and the destination node in the network. Routing tables are then established to route traffic within the network according to the percentage values resulting from the linear optimization operation.

28 Claims, 12 Drawing Sheets

METHOD AND APPARATUS FOR ROUTING TRAFFIC WITHIN A NETWORK UTILIZING LINEAR OPTIMIZATION

FIELD OF THE INVENTION

The present invention relates generally to the field of computer networking and, more specifically, to the routing of packets within a computer network between a source node and a destination node.

BACKGROUND OF THE INVENTION

The movement of data between source and destination nodes within a network is facilitated by routers, which develop pathways through a mesh of interconnections or links. While a mesh network provides redundant pathways to compensate for traffic loads or downed lines, the use of one pathway as opposed to another may be preferred for various reasons, such as speed, cost and congestion-avoidance. Routing protocols provide routers with the information required to create pathways through mesh networks based on routing information that is shared by routers.

A router may have a multiplicity of ports, and typically maintains routing tables (also known as forwarding tables) that indicate which port of the router a particular network address is located on. Routing protocols may broadly be classified as either static routing protocols, wherein routing pathways are specified by a network manager, or dynamic routing protocols, which rely on the router to collect information concerning the network and to build up-to-date routing tables. Routers periodically exchange routing tables with each other, and each router merges routing information to create new and updates routing tables.

Two common categories of dynamic routing protocols include distance-vector routing protocols and link-state routing protocols. Distance-vector routing protocols route packets based on the number of hops (or links) that must be traversed between a source node and a destination mode. Each hop (or link) is assigned a cost that identifies the distance between a routing node and its neighbors. The route that produces the least cost is selected as the propagation route. A popular distance-vector routing protocol is the Routing Information Protocol (RIP).

Link-state routing protocols are more sophisticated than distance-vector routing protocols and provide a greater degree of control over the routing process. For example, routes can be based on the avoidance of congested areas, the speed of links, the cost of using a link or various other criteria. The well-known Dijkstra algorithm is typically used to calculate routes based on a number of criteria including:

1. the number of hops between a source and destination node;
2. the speed of links between nodes;
3. delays caused by traffic congestion; and
4. the cost of a route, which is typically a metric defined by an administrator.

A popular link-state algorithm is the Open Shortest Path First (OSPF) protocol. The OSPF protocol is attractive in that an administrator can program pathways through a mesh network based on a traffic type. Further, OSPF routing tables updates only occur when necessary, rather than at predetermined intervals, thus reducing network traffic.

While the above protocols provide satisfactory results, they do not address phase delays and other factors introduced by mismatches in transmission speeds between links that constitute a possible pathway. Further, such protocols are not optimized for networks in which switched media dominates over shared media.

SUMMARY OF THE INVENTION

According to a first aspect of the invention, there is provided a method of routing traffic within a network including a plurality of nodes coupled by links. A set of metrics is determined for a corresponding set of links within the network. A linear optimization operation is performed utilizing the set of metrics to determine respective traffic flow values for links coupling a source node and a destination node within the network. Traffic within the network is routed according to the traffic flow values.

According to a second aspect of the invention, there is provided a network device configured to route network traffic as determined by a linear optimization operation performed using a set of metrics, corresponding to a set of links within the network.

Other features of the present invention will be apparent from the accompanying drawings and the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for routing traffic within a network utilizing linear optimization techniques are described. In the following description, for purposes of explanation, numerous specific details are set forth in order to provide a thorough understanding of the present invention. It will be evident, however, to one skilled in the art that the present invention may be practiced without these specific details.

Exemplary Network

Figure 1:
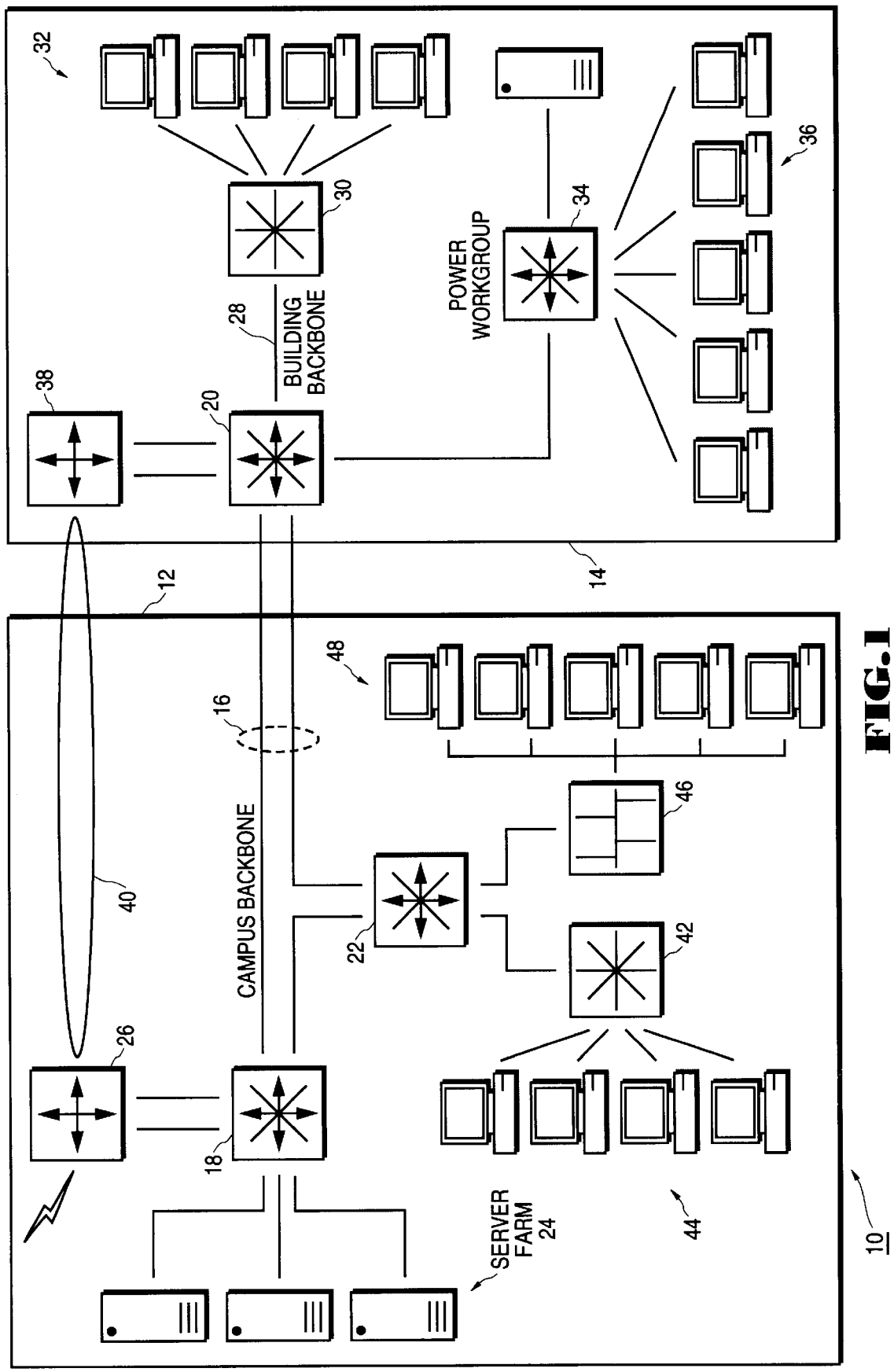
FIG. 1 is a schematic diagram illustrating an enterprise-wide network within which the present invention may be employed.

FIG. 1 is a schematic representation of an exemplary enterprise-wide network 10 which spans a main building 12 and a subsidiary building 14, and within which the present invention may be implemented. A campus backbone 16 connects three routing switches (also known as gateways) 18, 20 and 22, each of which may be an Accelar™ routing switch manufactured by Bay Networks, Inc. of Santa Clara, Calif. The backbone 16 provides Gigabit Ethernet bandwidth to support policy based traffic. The routing switch 18 serves as a gateway to a server farm 24, and also couples a router 26, dedicated to remote access, to the backbone 16.

The routing switch 20 is coupled via a building backbone 28 to a switch 30 which services a number of end stations 32. The routing switch 20 is coupled to a further routing switch 34 that services end stations 36 of a power work group, thus implementing a high-bandwidth Gigabit Ethernet path to the power work group. The routing switch 20 is furthermore coupled to a router 38, which is in turn coupled to the router 26 via a token-ring connection 40.

The routing switch 22 is coupled to a switch 42 serving a bank of end stations 44, and to a repeater 46 servicing a bank of end stations 48.

In a typical application, the enterprise-wide network 10 may couple the main building 12 to a number of subsidiary buildings within a campus, and also to off-site buildings located at remote locations. It will be appreciated that the various links (or hops) that couple the network devices within the enterprise network 10 may have varying transmission speeds. For example, the link between the routing switch 18 and the router 26 may comprise a 100 Mbps connection, whereas the backbone 16 may provide a 1 Gbps connection. The present invention proposes a method and apparatus for routing network traffic within a network, such as for example the enterprise-wide network 10, taking into account differences in bandwidth, traffic congestion and associated delays.

Figure 2:
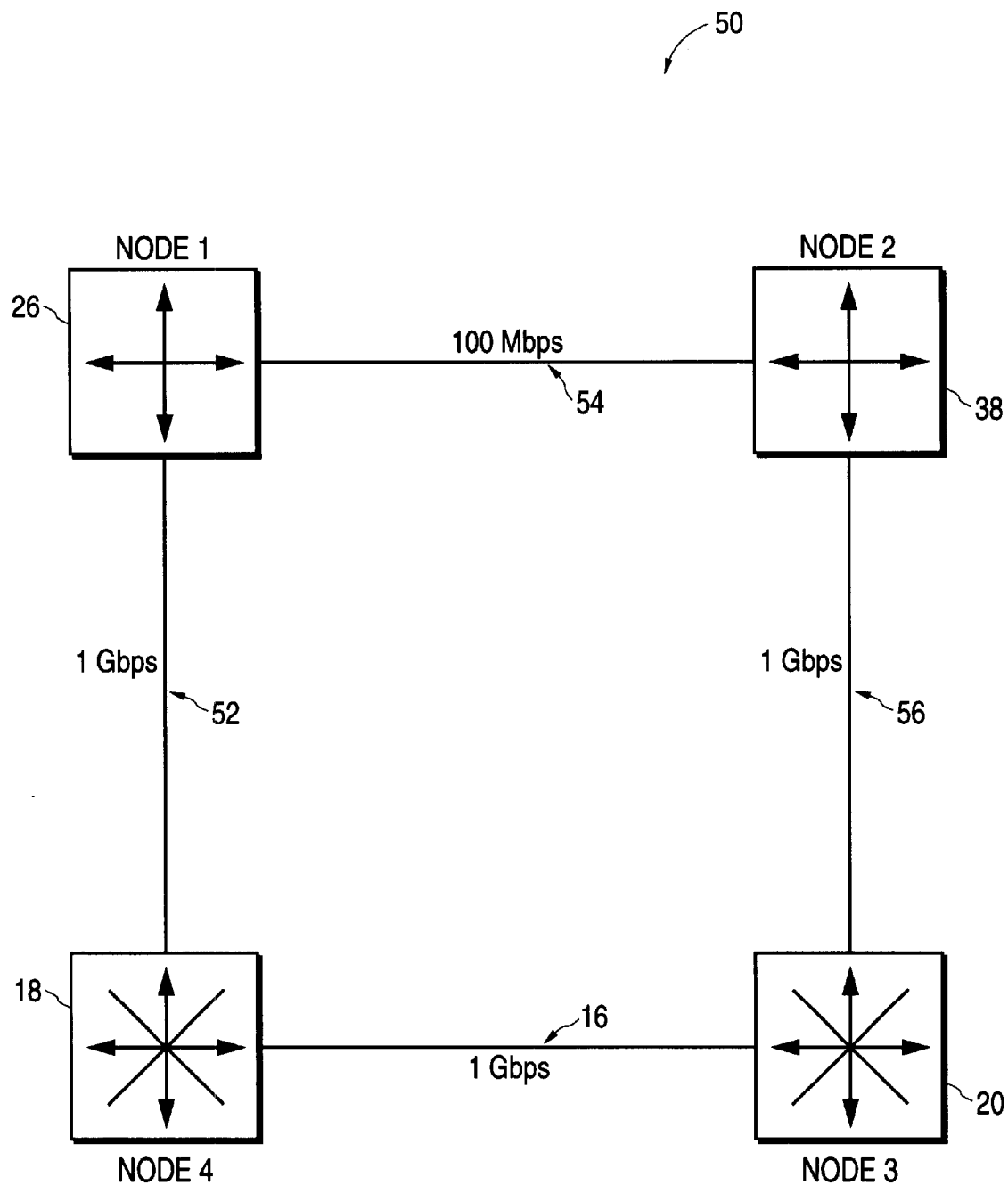
FIG. 2 is a block diagram providing a simplified representation of the enterprise-wide network shown in FIG. 1, showing only selected network devices.

Referring to FIG. 2, a block diagram provides a simplified representation of selected network devices (i.e., a set of network devices) within the network 10, and links that exist between these network devices (i.e., a set of links). Specifically, an exemplary network 50 including the routing switches 18 and 20 and the routers 26 and 38 is shown. Each of the devices 18, 20, 26 and 38 may accordingly be viewed as a node within the network 50, and may comprise a gateway to a sub-network. The router 26 is coupled to the routing switch 18 via a 1 Gbps link 52, the routing switch 18 is coupled to the routing switch 20 via a 1 Gbps link 16, and the routing switch 20 is coupled to the router 38 via a 1 Gbps link 56. The routers 26 and 38 are coupled via a 100 Mbps link 54.

For purposes of simplicity, the methodology of the present invention will below be described with reference to the reduced and exemplary-network 50 shown in FIG. 2. It will of course be appreciated that, in practice, the methodology described below will be employed on a much larger scale within a substantially more complex network. The present invention finds particular application in small-to-medium size networks, in which link speeds dominate the characteristics of the networks. The present invention is furthermore not specific to Internet Protocol (IP) routing, and may be used in any situation which requires switching or routing.

Linear Optimization

For the purposes of the present application, the term "linear optimization" shall be defined as the determination of an optimal value (e.g., a maximum or minimum value) of a linear function of a certain number of variables, given a set of linear constraints on those variables (e.g., equalities or inequalities). The term "linear programming" shall refer to the solving of a linear function, and to the development of algorithms and/or software to find the above mentioned optimal value. Linear optimization may be performed using the techniques and methodologies commonly understood to be incorporated within linear programming, network programming, quadratic programming, stochastic programming or any other publicly available programming technique.

The present invention proposes using linear optimization techniques to achieve an effective utilization of network links, and to balance network traffic loads between links. The present invention proposes using linear optimization to account for speed mismatches which may exist between links in a network, and also to indicate which pathway through a mesh network exhibits a desirable characteristic.

More specifically, the present invention distributes the flow of network traffic between a source node and a destination node over a number of potential links, and in a manner proportional to the bandwidths of the links that constitute a complete path between the source and destination nodes.

The methodology proposed by the present invention may substitute OSPF routing algorithms employed within the network.

Figure 3:
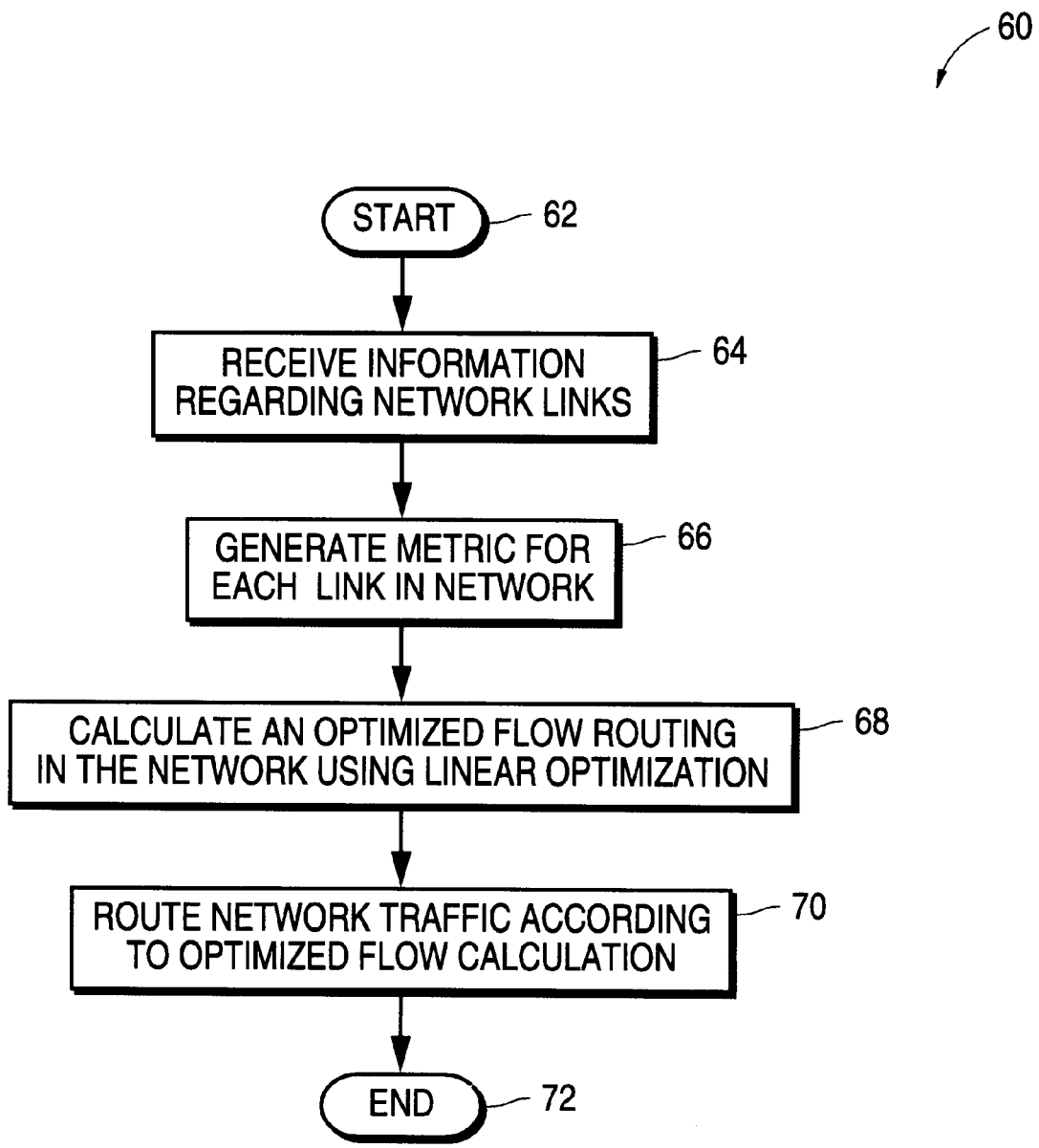
FIG. 3 is a flow chart illustrating a method, according to one exemplary embodiment of the invention of the invention, of routing traffic within a network using linear optimization techniques.

Methodology-Routing of Network Traffic Utilizing Linear Optimization Techniques FIG. 3 shows a high level flow chart illustrating a method 60 of routing network traffic within a network utilizing linear optimization techniques. In one embodiment of the present invention, the method 60 is performed in a distributed manner within a network by various devices, such as routers, routing switches and switches.

The method 60 commences at step 62, and then proceeds to step 64, where the network device performing the method 60 receives information regarding network links. Specifically, each node within a network periodically broadcasts information indicating a theoretical maximum bandwidth of links coupled to the respective node, as well as information regarding the current network traffic loads present on such links. This information may be distributed using a modified OSPF protocol, an intra-area Protocol Data Unit (PDU) or via a proprietary internal protocol.

At step 66, a metric for each link within a predetermined set of links of the network is generated. In one embodiment of the invention, the set of links comprises at least the links included within all potential pathways between a specific source and destination node pairing. Further details regarding the generation of each metric are discussed below with reference to FIG. 4.

Figure 4:
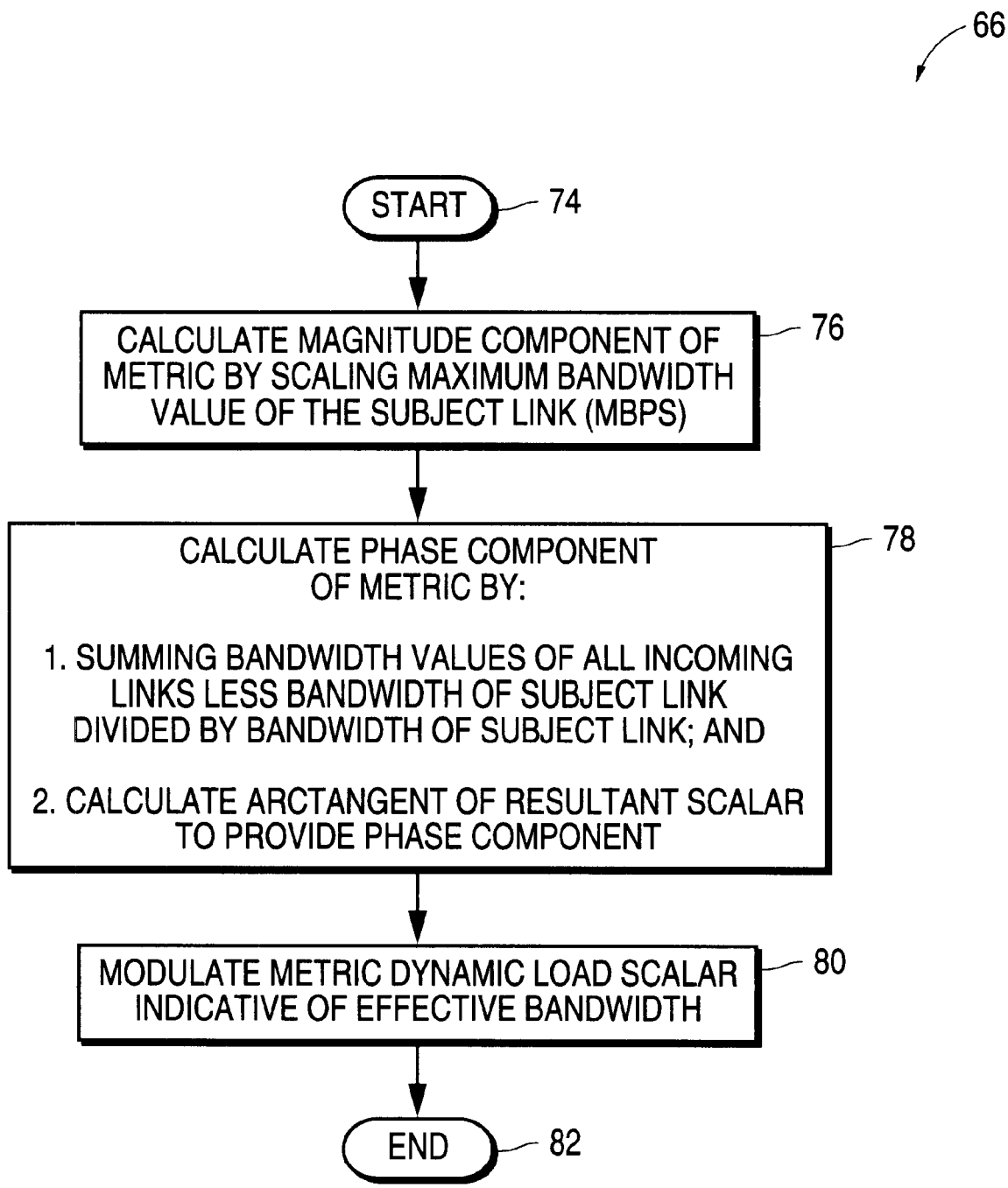
FIG. 4 is a flow chart diagram illustrating the steps performed in the generation of a metric, according to one embodiment of the present invention, within a network.

FIG. 4 is a flow chart illustrating the steps performed in the generation of a metric for a link within a network. Subsequent to the start step 74, a magnitude component for a metric of a link is calculated by determining a maximum theoretical bandwidth value, expressed in bits per second (bps), for the relevant link. The maximum theoretical bandwidth value is then scaled by a factor to facilitate easy manipulation for Ethernet speeds. Referring to the metric 50 in FIG. 2, a magnitude component for a metric associated for the link 54 may accordingly have a scaled magnitude component of 1, and a metric associated with the link 52 would have a scaled magnitude component of 10.

At step 78, a phase component for a metric is calculated by summing bandwidth values of all links feeding into a node that is the "input" end-point of a subject link (including the incoming bandwidth of the subject link), less the outgoing bandwidth of the subject link, divided by the outgoing bandwidth of the subject link. The arctangent of the resultant scalar is calculated to provide the phase component. Negative phases indicate a time delay produced by the relative link transmission speed mismatches.

Figure 5A:
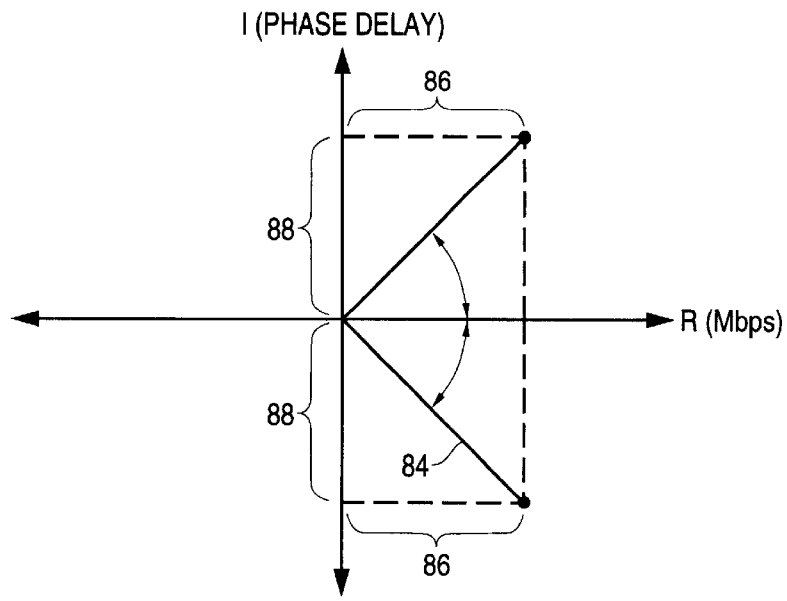
FIG. 5A is a plot of an exemplary metric.
Figure 5B:
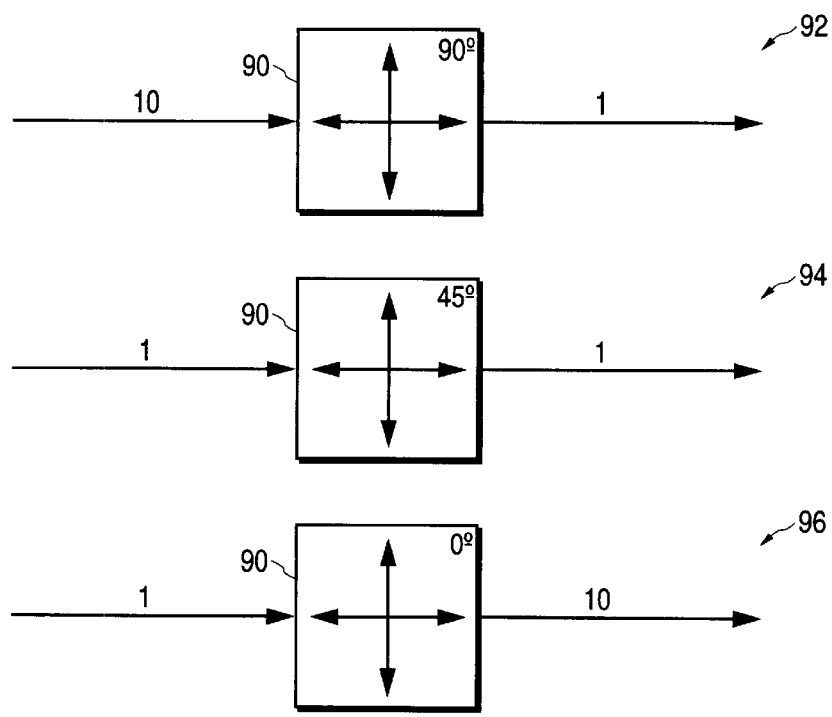
FIG. 5B is a block diagram illustrating a router coupling three pairs of links, two of which have transmission speed mismatches.

FIG. 5A is a plot of an exemplary metric, showing the real component 86 and the imaginary component 88 thereof. FIG. 5B illustrates an exemplary router 90 coupled between three pairs of links having varying transmission speeds. As illustrated at 92, a simple speed mismatch of 10/1 introduces a phase delay of approximately 90°. An evenly matched system introduces a phase delay of approximately 45°, as illustrated at 94. A 1/10 mismatch, as illustrated at 96, introduces a phase delay of approximately 0°.

In summary, each metric comprises a complex number determined according to the following equation:

$$f_{ij} = BW_{out} \angle \tan^{-1}\left(\frac{\sum BW_{in} - BW_{subj\_in}}{BW_{subj\_out}}\right) \quad (E2)$$

$$= f_{ji}$$

where:

$f_{ij}$ is the metric value for a link between nodes i and j.

$B_{subj\_out}$ is the scaled outgoing bandwidth of the subject link.

$BW_{subj\_in}$ is the scaled incoming bandwidth of the subject link.

$BW_{in}$ is the scaled incoming bandwidth of any link feeding into an input node of the subject link.

For the exemplary network 50 shown in FIG. 2, the following metrics may be calculated:

TABLE 1

| LINK METRIC | VALUE | LINK METRIC | VALUE |
|---|---|---|---|
| $f_{11}$ | 0 | $f_{21}(=f_{12})$ | $1\angle\tan^{-1}(1/10)$ |
| $f_{12}$ | $1\angle\tan^{-1}(1/10)$ | $f_{22}$ | 0 |
| $f_{13}$ | 0 | $f_{23}$ | $10\angle\tan^{-1}(1)$ |
| $f_{14}$ | $1\angle\tan^{-1}(1)$ | $f_{24}$ | 0 |
| $f_{31}(=f_{13})$ | 0 | $f_{44}(=f_{14})$ | $1\angle\tan^{-1}(1)$ |
| $f_{32}(=f_{23})$ | $10\angle\tan^{-1}(1)$ | $f_{42}(=f_{24})$ | 0 |
| $f_{33}$ | 0 | $f_{43}(=f_{34})$ | $10\angle\tan^{-1}(1)$ |
| $f_{34}$ | $10\angle\tan^{-1}(1)$ | $f_{44}$ | 0 |

Returning to the flowchart shown in FIG. 4, at step 80, each metric is modulated with a dynamic load scalar indicative of the effective bandwidth of the relative link. This facilitates the routing and rerouting of traffic according to varying traffic loads. Depending on the time periods involved, the effective bandwidth of a link may either approach the theoretical maximum bandwidth or may vary substantially therefrom, in which case the metric will be modulated accordingly. In one embodiment of the invention, the metric is modulated so that the real component thereof approximately equals the effective bandwidth. Specifically, at link initialization, metrics indicative of a theoretical maximum bandwidth are exchanged between network nodes. Dynamic load scalars are exchanged periodically (1–10 sec.), and may each be a number between 0–1. Associated metrics and dynamic load scalars are multiplied together to provide the effective bandwidth for a link.

Figure 6A:
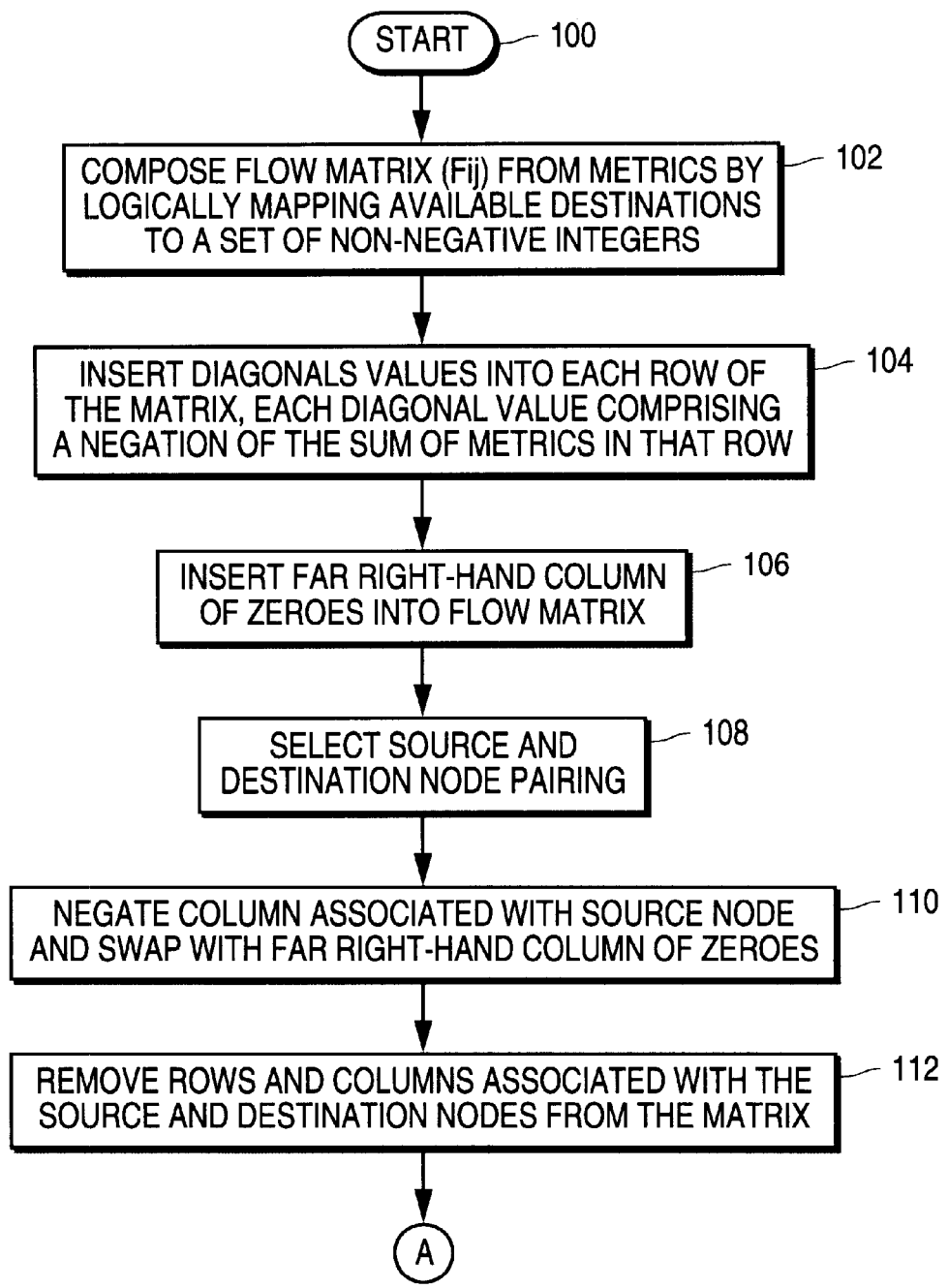
FIGS. 6A and 6B are flow charts illustrating the steps to calculate an optimized flow routing, according to one exemplary embodiment of the present invention.

Returning to the flowchart shown in FIG. 3, at step 68, an optimized flow routing in the network is calculated using linear optimization techniques. Further details of the steps involved in the calculation of the optimized flow routing are provided in FIGS. 6A and 6B. Following start step 100, a flow matrix ($F_{ij}$) is composed from the calculated metrics, by logically mapping available destinations to a set of non-negative integers. An exemplary flow matrix (M1) is provided below for the reduced network 50 as shown in FIG. 2. The metric values are those provided in Table 1 above. For the purposes of explanation, the examples provided below of the construction and manipulation of the matrix shall assume that a matrix comprises only real numbers, and not complex numbers as may be the case in actual implementation. However, it will be readily appreciated by those skilled in the art that the methodologies described below may be readily applied to a matrix including complex numbers, and that the examples provided are exemplary and provided to assist in understanding of the present invention.

$$Fij^0 = \begin{bmatrix} 0 & 1 & 0 & 10 \\ 1 & 0 & 10 & 0 \\ 0 & 10 & 0 & 10 \\ 10 & 0 & 10 & 0 \end{bmatrix} \quad (M1)$$

At step 104, diagonal values are inserted into each row of the flow matrix $F_{ij}$. Each diagonal value comprises a negation of the sum of metrics in the relevant row and may be expressed in terms of the following equation:

$$f_{ii} = -\sum_{j \in J} f_{ij} \text{ where } J = 0 \ldots N-1 \quad (E2)$$

For the present example, this step delivers the following matrix (M2):

$$Fij^1 = \begin{bmatrix} -11 & 1 & 0 & 0 \\ 1 & -11 & 10 & 0 \\ 0 & 10 & -20 & 10 \\ 10 & 0 & 10 & -20 \end{bmatrix} \quad (M2)$$

It will be recognized that the matrix M2 represents equilibrium equations for each node of the reduced network 50 shown in FIG. 2, with the metrics being a given set of linear constraints (i.e., bandwidth constraints) for such equilibrium equations.

At step 106, a far right-hand column of zeros is inserted into the flow matrix $F_{ij}$. In the present example, the following matrix is rendered:

$$Fij^2 = \begin{bmatrix} -11 & 1 & 0 & 10 & 0 \\ 1 & -11 & 10 & 0 & 0 \\ 0 & 10 & -20 & 10 & 0 \\ 10 & 0 & 10 & -20 & 0 \end{bmatrix} \quad (M3)$$

At step 108, a source and destination node pairing is identified. As noted above, the method 60 illustrated in FIG. 3, in one embodiment of the present invention, is performed on each network device that performs a routing function. The source node may accordingly be selected to be the network device on which the method 60 is being executed. For the purposes of the example provided, it will be assumed that the method 60 is being executed on the router 26 (i.e., node 1), and that the determination of a routing flow for traffic received at the router 26 and destined for the switching router 20 (i.e., node 3) is being performed. Accordingly, the source node is selected as router 26 (i.e., node 1) and the destination node is selected as the routing switch 20 (i.e., node 3).

At step 110, a column associated with the source node (e.g., column 1) is negated and swapped with the far right-hand column of zeros. For the present example, the following matrix M4 will accordingly result:

$$Fij^3 = \begin{bmatrix} 0 & 1 & 0 & 10 & 11 \\ 0 & -11 & 10 & 0 & -1 \\ 0 & 10 & -20 & 10 & 0 \\ 0 & 0 & 10 & -20 & -10 \end{bmatrix} \quad (M4)$$

At step 112, columns and rows associated with the source and destination nodes are removed from the matrix. In the present example, rows 1 and 3, as well as columns 1 and 3 (these being associated with the source Node 1 (i.e., router 26) and the destination Node 3 (i.e., routing switch 20)) are deleted from the matrix M4 to produce the following resultant matrix M5:

$$Fij^4 = \begin{bmatrix} -11 & 0 & -1 \\ 0 & -20 & -10 \end{bmatrix} \quad (M5)$$

At step 114, the resulting matrix is then placed in a row-reduced echelon form, using techniques well defined in matrix algebra. The row-reduced echelon form of the matrix M5 as follows:

$$Fij^5 = \begin{bmatrix} 1 & 0 & \frac{1}{11} \\ 0 & 1 & \frac{1}{2} \end{bmatrix} \quad (M6)$$

At step 116, the row-reduced echelon form matrix is then solved using Gaussian elimination to generate an absolute potential vector ($V_{ii}$) for the relevant source and destination node pairing. The absolute potential vector includes a potential value of one (1) for the source node, and a potential value of zero (0) for the destination node, the potentials at any intermediate nodes being generated by the solution of the matrix. In the exemplary embodiment, the generation of the absolute potential vector ($V_{ii}$) produces the following results:

$$V_i^0 = \begin{bmatrix} 1 \\ V_2 \\ 0 \\ V_4 \end{bmatrix} \quad (V1)$$

$$V_i^1 = \begin{bmatrix} 1 \\ \frac{1}{11} \\ 0 \\ \frac{1}{2} \end{bmatrix} \quad (V2)$$

Returning to FIG. 6B, at step 118 potential difference operations are performed using the absolute potential vector ($V_i$) to generate a potential difference matrix ($V_{ij}$) comprising entries ($v_{ij}$) generated from the entries ($v_i$) of the potential difference vector according to the following equation:

$$v_{ij} = v_i - v_j \quad (E3)$$

Accordingly, for the present example, a potential difference matrix (M7) will appear as follows:

$$V_{ij} = \begin{bmatrix} 0 & \frac{10}{11} & 1 & \frac{1}{2} \\ \frac{-10}{11} & 0 & \frac{1}{11} & \frac{-9}{22} \\ -1 & \frac{-1}{11} & 0 & \frac{-1}{2} \\ \frac{-1}{2} & \frac{9}{22} & \frac{1}{2} & 0 \end{bmatrix} \quad (M7)$$

As the values for a flow matrix ($F_{ij}$), such as matrix M2 above, and the values for a potential difference matrix ($V_{ij}$), such as the matrix M7 above are know, it is now possible to solve the following equation to generate a routing matrix ($I_{ij}$):

$$I_{ij} = V_{ij} \cdot F_{ij} \quad (E4)$$

Figure 6B:
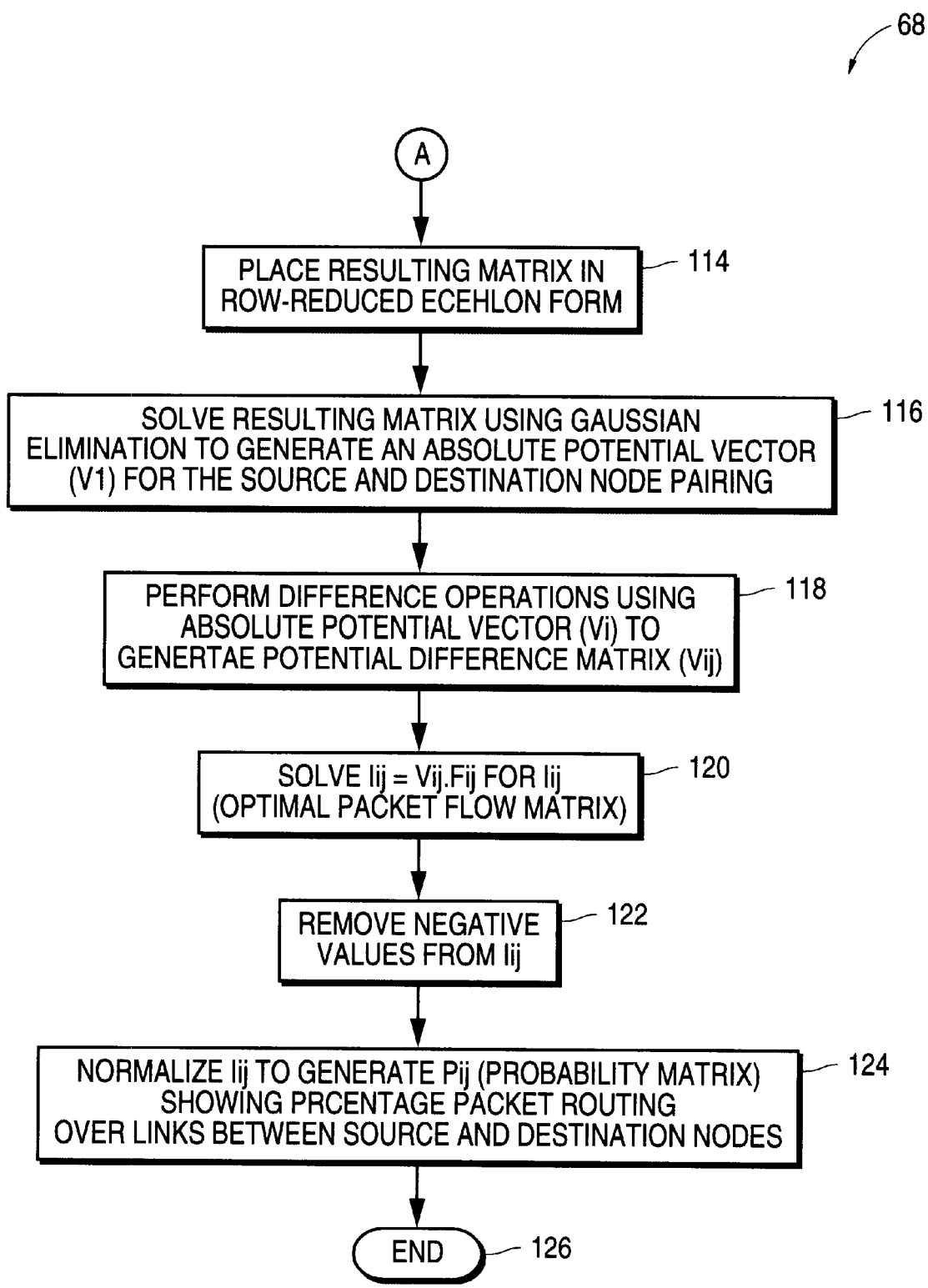

This is indicated at step 120 in FIG. 6B, and in the present exemplary embodiment, generates the following routing matrix:

$$I_{ij} = \begin{bmatrix} 0 & \frac{10}{11} & 0 & 5 \\ \frac{-10}{11} & 0 & \frac{10}{11} & \frac{-9}{22} \\ 0 & \frac{-10}{11} & 0 & -5 \\ -5 & 0 & 5 & 0 \end{bmatrix} \quad (M8)$$

As the present analysis is being done with respect to network traffic propagated from the source node to the destination node, all negative values within the routing matrix ($I_{ij}$) are nulled at step 122, thus rendering the following matrix (M9) for the present example:

$$I_{ij} = \begin{bmatrix} 0 & \frac{10}{11} & 0 & 5 \\ 0 & 0 & \frac{10}{11} & 0 \\ 0 & 0 & 0 & 0 \\ 0 & 0 & 5 & 0 \end{bmatrix} \quad \text{(M9)}$$

At step 124, the routing matrix ($I_{ij}$) is normalized to generate a probability matrix ($P_{ij}$) showing percentage values indicative of the percentage of network traffic traveling from the source node to the destination node that should be sent over respective links comprising potential pathways between the source node and the destination node. The normalization of the routing matrix ($I_{ij}$) is performed according to the following equation:

$$p_{ij} = \frac{i_{ij}}{\sum_{j \in J} i_{ij}} \text{ where } J = 0 \ldots N - 1 \quad \text{(E5)}$$

The following probability matrix (M10) is accordingly generated for the present example:

$$P_{ij} = \begin{bmatrix} 0 & 0.15 & 0 & 0.85 \\ 0 & 0 & 1 & 0 \\ 0 & 0 & 1 & 0 \end{bmatrix} \quad \text{(M10)}$$

The probability matrix (M10) indicates the following percentage values for the routing of network traffic, destined for Node 3, from the source node (i.e., Node 1 which is the router 26) to the destination node (i.e., Node 3 which is the routing switch 20):

1. 15% of network traffic from Node 1 should be routed to Node 2;
2. 85% of network traffic from Node 1 should be routed to Node 4;
3. 100% of network traffic from Node 2 (and originating from Node 1, destined for Node 3) should go to Node 3; and
4. 100% of network traffic from Node 4 (and originating at Node 1, destined for Node 3) should be routed to Node 3.

Routing According to the Optimized Flow Calculation

Returning to FIG. 3, following completion of step 68, the method 60 proceeds to step 70, where network traffic is routed according to the optimized flow calculation performed at step 68.

While it will be appreciated that a number of ways of routing traffic according to the optimized flow calculation may be implemented, an exemplary method is now described with reference to FIGS. 7A, 7B and 7C. Specifically, FIG. 7B illustrates a portion of a network comprising three nodes, 1, 2 and 3. Node 1 has an IP address of 19.1.10.1, Node 2 has an IP address of 19.1.15.1, and node 3 has an address of 19.1.20.1. Path 1 extends between Nodes 1 and 2, Path 2 extends between Nodes 1 and 3, and Path 3 extends between Nodes 2 and 3.

Figure 7A:
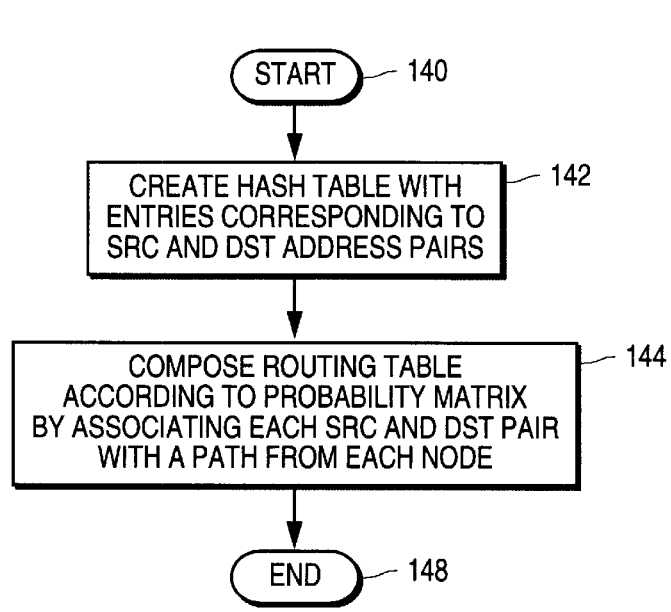
FIGS. 7A–7C is a flow chart showing the steps required for the virtual manipulation of a matrix, according to one exemplary embodiment of the present invention.
Figure 7B:
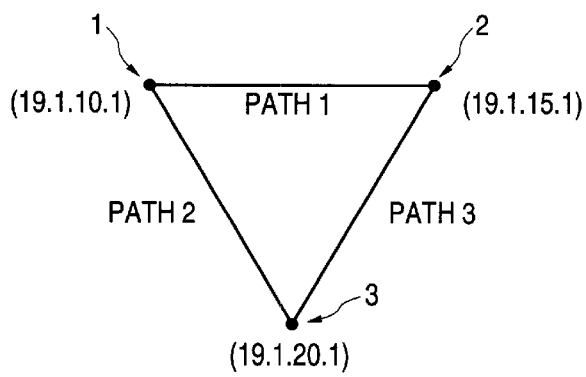
Figure 7C:
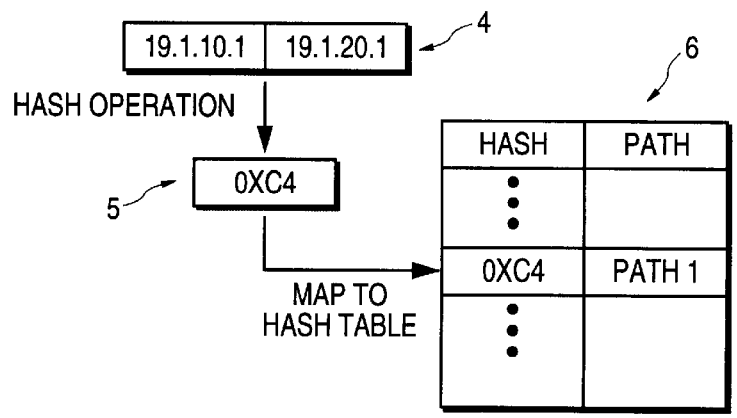

FIG. 7A is a flow chart illustrating an exemplary method 138, according to one embodiment of the present invention, of routing network traffic according to the optimized flow calculation. A source and destination address pair, indicated at 4 in FIG. 7C, may be subject to a hash operation at step 142 to generate an 8-bit hash value 5 (or Cyclic Redundancy Check (CRC) value). Utilizing the hash value 5, and appropriate mutually exclusive bitmasks, the hash value 5 may be mapped to an appropriate identifier within a hash table 6 at step 144. In this way, a unique path for each source and destination address may be identified. The hash table 6 is constructed to implement the result of the optimized flow calculation detailed above.

For a given flow (i.e., for a specific source and destination address pair), the selected path is not toggled unless a significant topology change occurs, such that the indicated path becomes invalid. At that time, the hash table 6 is flushed and re-constructed according to new routing information. All packets from a single path will then take the new route, and continue to do so until the next topology change.

The Virtual Matrix

According to one embodiment of the present invention, many of the manipulations performed on the matrices described above may be performed "virtually" by maintaining a discrete row and column "connected" matrix associated with the actual physical data structure and indicating which nodes are connected by operational nodes to a specific node. The present invention proposes screening or filtering a large matrix, such as the flow matrix ($F_{ij}$) or the potential difference matrix, through the connected matrix, so that only data for links reachable by a source node are utilized in the generation of a routing matrix. Performing matrix manipulation via such a translation connected matrix is particularly useful in a network having a large number of nodes, where the continual copying of a substantial matrix would consume an inordinate amount of memory resource capacity. The use of such a connected matrix to reduce the size of a working matrix allows actual values which comprise the working matrix to in fact be very dispersed.

Figure 8A:
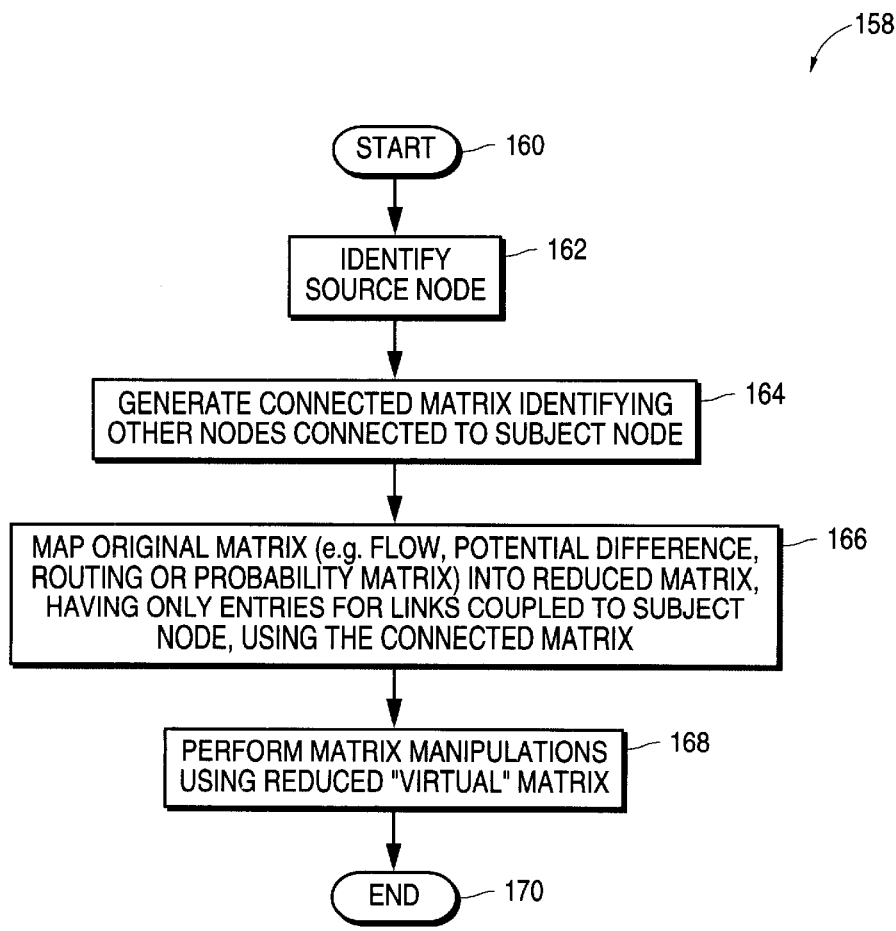
FIGS. 8A, 8B is a flow chart illustrating a method, according to one exemplary embodiment of the present invention, of performing a virtual manipulation of a matrix.

FIG. 8A is a flow diagram illustrating a method 158 of performing the virtual manipulation of any one of the matrices discussed above. The method 158 commences at step 160 and proceeds to step 162 where a subject node within the matrix is identified. At step 164, a connected matrix identifying other nodes that are reachable from the subject node is generated. For example, referring to FIG. 8A, a network having 6 nodes (NODE 1–NODE 6) is shown. A link 165 between NODE 3 and NODE 4, as shown in broken line, is not operational, and accordingly NODES 4, 5 and 6 are not reachable from NODE 1. Accordingly, an exemplary connected matrix for which NODE 1 is the source node may be represented as follows:

$$\text{NODE } 1 = \begin{array}{c} \phantom{0} \\ 1 \\ 2 \\ 3 \\ 4 \\ 5 \\ 6 \end{array} \begin{array}{c} 1 \ 2 \ 3 \ 4 \ 5 \ 6 \\ \begin{bmatrix} 0 & 1 & 1 & 0 & 0 & 0 \\ 1 & 0 & 0 & 0 & 0 & 0 \\ 1 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix} \end{array} \quad \text{(C1)}$$

$$= \begin{bmatrix} 0 & 1 & 1 \\ 1 & 0 & 0 \\ 1 & 0 & 0 \end{bmatrix} \quad \text{(C2)}$$

At step 166, the original matrix is mapped into a reduced matrix, having entries for only those links readable to the subject node, using the connected matrix. At step 168, matrix manipulation are performed using the reduced "virtual" matrix. The method 158 terminates at step 170.

Figure 8B:
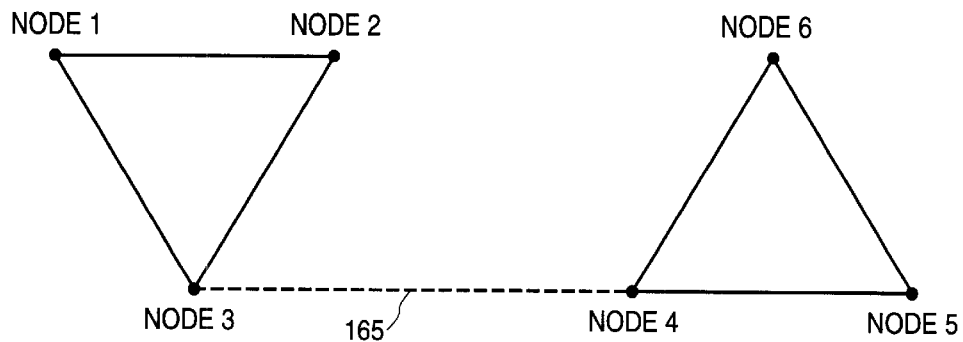
Figure 9:
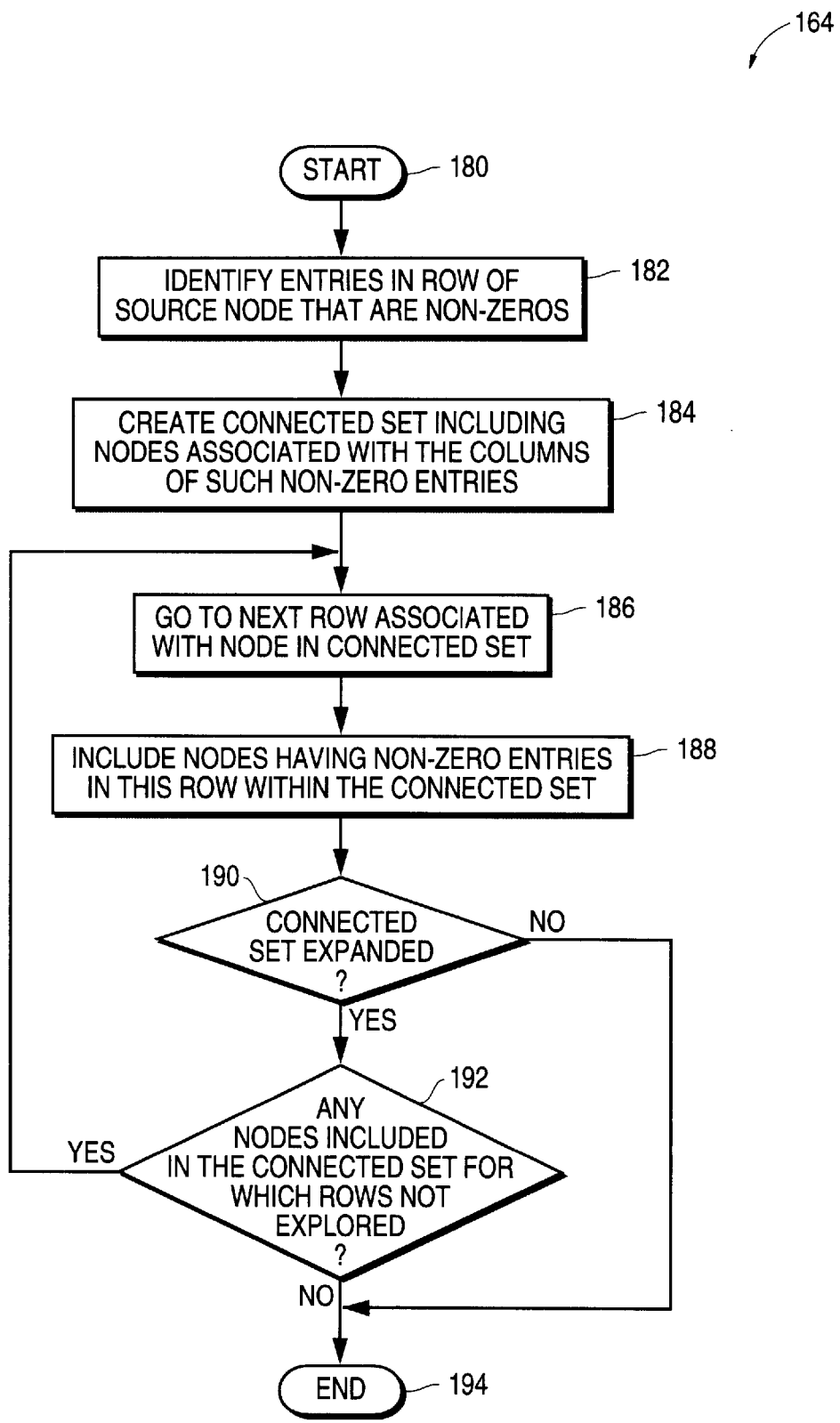
FIG. 9 is a flow chart illustrating the generation of a connected matrix, according to one exemplary embodiment of the present invention.

FIG. 9 is a flowchart illustrating one exemplary embodiment of the step 164 in FIG. 8, for generating the connected matrix. Starting at step 180, entries within a row (including the subject node) within the original matrix (e.g., a flow matrix) that are non-zero entries are identified. At step 184, a connected set listing nodes associated with columns including such non-zero entries is created.

At step 186, a next row within the original matrix associated with a node, other than the previous subject node, included in the connected set is investigated to identify non-zero entries within this next row. At step 188, nodes associated with columns of non-zero entries in this next row are included within the connected set. At decision box 190, a determination is made as to whether the connected set has been expanded to include any further nodes at step 188. If not, the step 164 terminates at step 194. If so, a determination is made at decision box 192 whether there are any nodes included within the connected set for which rows of the original matrix have not been investigated to identify non-zero entries. If not, the step 164 again terminates at step 194. Alternatively, the step 194 loops back to step 186. The connected set, which identified nodes reachable from the source node, is then utilized to generate the connected matrix.

Software Architecture

Figure 10:
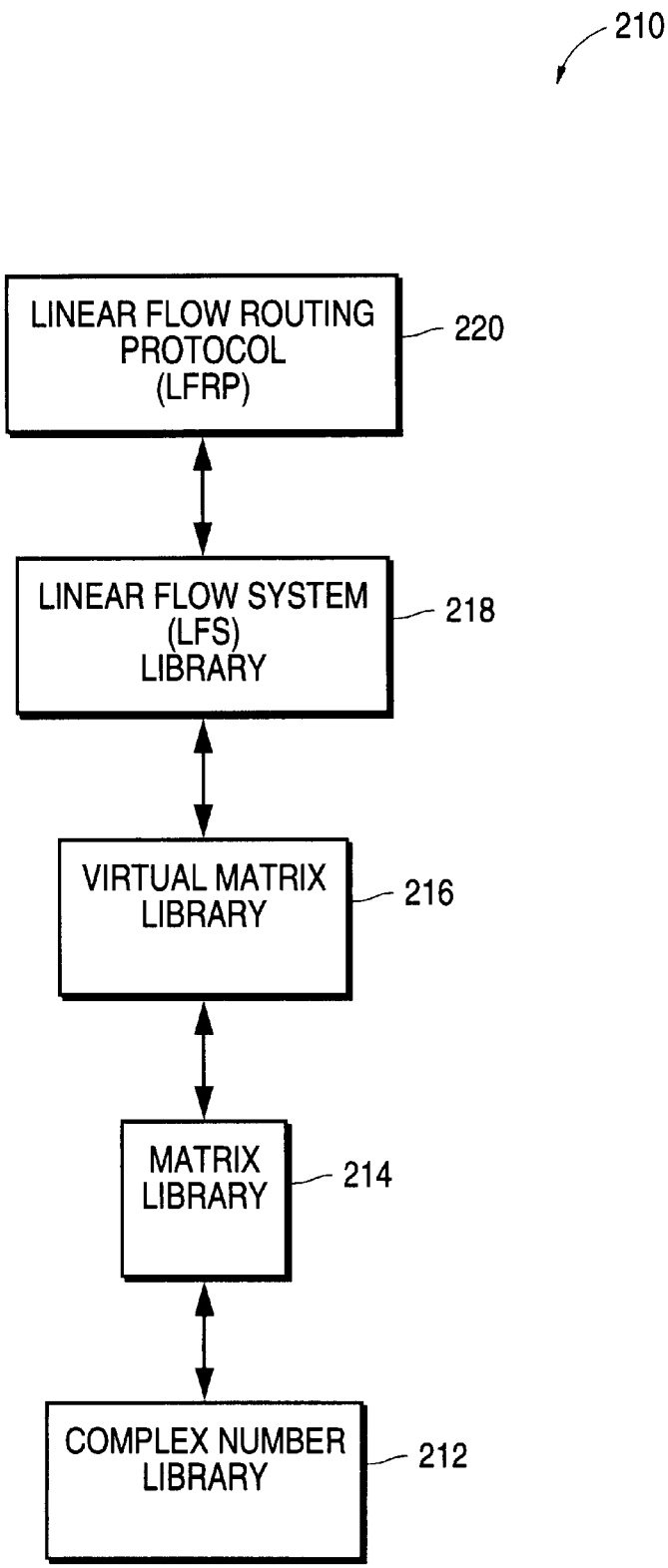
FIG. 10 is a block diagram illustrating the architecture of an exemplary embodiment of a software program for performing any one of the methodologies of the present invention.

FIG. 10 is a block diagram illustrating the architecture of one exemplary embodiment of a software program 210 for performing any one of the methodologies according to the present invention and as detailed above. The software program includes a complex number library 212, which is responsible for performing all algebra on complex numbers within the matrices. A matrix library 214 is responsible for reading and writing to a matrix, deleting columns of a matrix and also inserting rows and columns into a matrix. A virtual matrix library 216 is responsible for performing algebra with respect to virtual matrix, as discussed above, and for generating row-reduced echelon forms of a matrix and for performing "virtual" operations on a matrix. A linear flow system (LFS) library 218 includes a collection of routers that are responsible for the maintenance of the flow matrix ($F_{ij}$), and specifically for regenerating the flow matrix when new nodes are added to the network from which the flow matrix was generated. Routers of the LFS library 218 are also responsible for generating a routing matrix utilizing the flow matrix, given a source and destination pairing, as described above with reference to FIGS. 6A–6B, and for removing old or outdated routing matrices from memory.

Finally, a linear flow routing protocol (LFRP) 220 is responsible for controlling and operating the libraries 212, 214, 216 and 218 to perform the overall linear optimization methodologies discussed above, and for generating routing tables in accordance with the outcome of a linear optimization operation.

Exemplary Routing Switch

Figure 11:
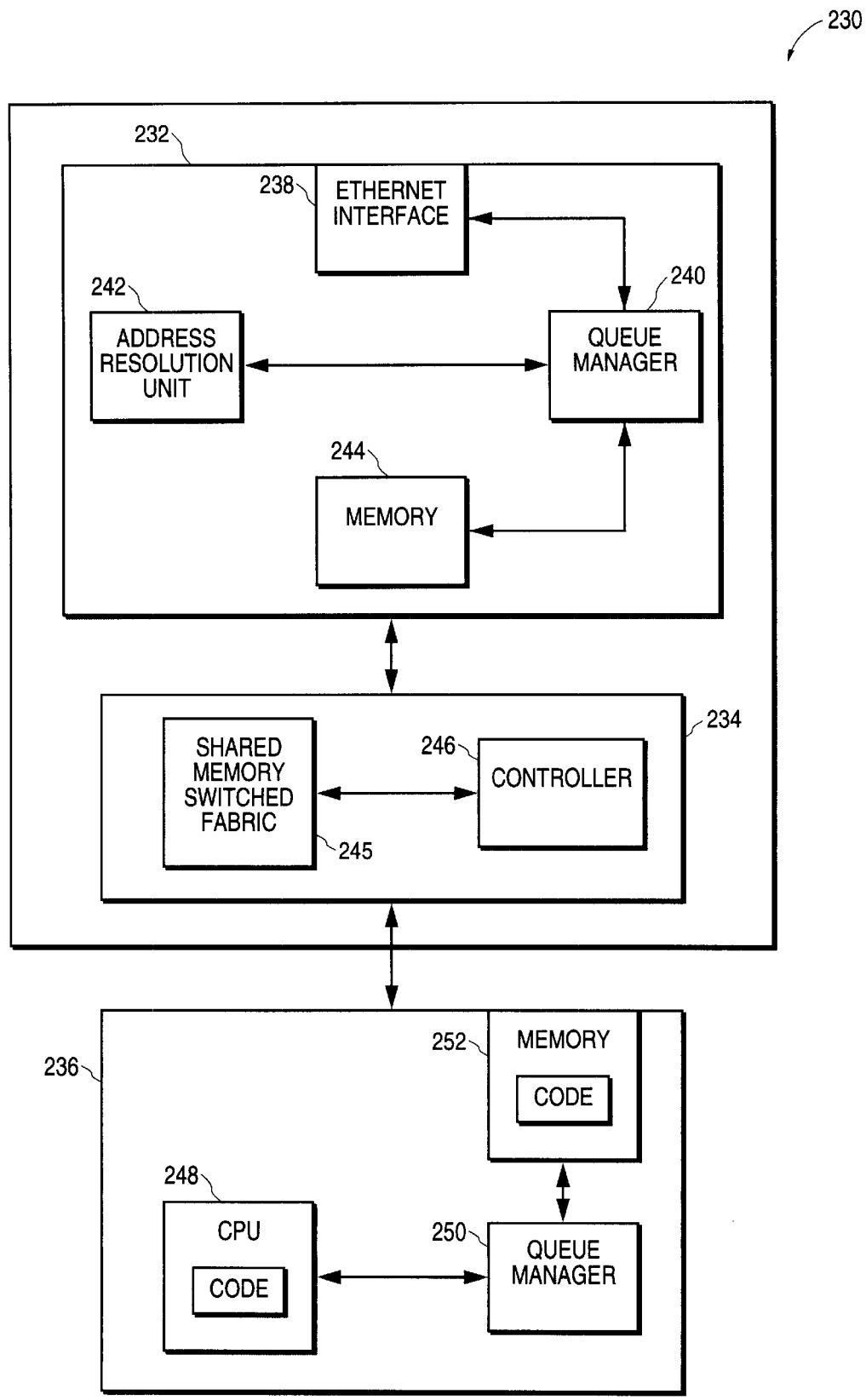
FIG. 11 is a block diagram illustrating the architecture of an exemplary routing switch, within which the present invention may be implemented.

FIG. 11 is a block diagram illustrating the architecture of an exemplary routing switch 230, within which the software program 210 illustrated in FIG. 10 may reside, and within which any one of the methodologies described above may be implemented. The routing switch 230 has three main hardware components, namely one or more input/output (I/O) modules 232, a shared switched fabric module 234 and a Central Processor Unit (CPU) module 236. Each I/O module 232 provides buffering functionality and an interface to a link of the network. Specifically, each I/O module 232 may include an interface unit 238, such as an Ethernet interface unit, a queue manager 240, an Address Resolution Unit (ARU) 242 and a memory resource 244. The ARU 242 maintains a local information base of both routed and bridged traffic, which allows the ARU 242 to resolve addresses and forward packets through the switch fabric independently of a CPU.

The switched fabric module 234 includes a shared memory switched fabric 245, which comprises the core of the routing switch 230 and is where actual packet forwarding occurs. A controller 246 is associated with the switched fabric 245.

The CPU module 236 includes a CPU 248, a queue manager 250 and memory resource 252, which may comprise a flash memory. The CPU 248 performs all protocol functions, and it is within this CPU 248 that software (or code) for performing the routing protocols of the present invention is executed. Routing and bridging tables computed by the CPU 248 are stored in the memory unit 252. The memory unit 252 is further shown to store code that may comprise a computer program for implementing an embodiment of the routing protocol described above. Packet forwarding information is derived from the routing tables, stored in the memory 252 and distributed to ARU units 242 on the I/O modules 232 included within the routing switch 230.

The code shown to reside partially or completely within the CPU 248 and the memory 252 may furthermore be transmitted from or received at the CPU module 236 via a network connection. For the purposes of this specification, the term "computer-readable medium" shall be taken to include any medium which is capable of storing or encoding a sequence of instructions for execution by a processor and that cause the processor to perform the methodologies of the present invention. Accordingly, the term "computer-readable medium" shall be taken to include, but not be limited to, solid state memories such as the flash memory 252 or a cache memory within the CPU 248, optical and magnetic disks and carrier wave signals.

In alternative embodiments, the present invention may be applicable to implementations of the invention in integrated circuits or chip sets, wireless implementations, switching systems products and transmission systems products. For purposes of this application, the terms "switching systems products" shall be taken to mean private branch exchanges (PBXs), central office switching systems that interconnect subscribers, toll/tandem switching systems for interconnecting trunks between switching centers, and broad band core switches found at the center of a service provider's network that may be fed by broad band edge switches or access muxes, and associated signaling, and support systems and services. The term "transmission systems products" shall be taken to mean products used by service providers to provide interconnection between their subscribers and their networks such as loop systems, and which provide multiplexing, aggregation and transport between a service provider's switching systems across the wide area, and associated signaling and support systems and services.

Thus, a method and apparatus for routing traffic within a network utilizing linear optimization techniques have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   determining a set of metrics for a corresponding set of links within a network;
   performing a linear optimization utilizing the set of metrics to determine respective traffic flow values for links coupling a source node and a destination node within the network each metric including a phase component comprising a sum of bandwidth values of links feeding into a node comprising an input end-point for the link corresponding to the metric, divided by the outgoing bandwidth of the corresponding link; and
   routing traffic within the network according to the traffic flow values.

2. The method of claim 1 wherein the sum of bandwidth values comprises bandwidth values of the links feeding into the input end-point node including incoming bandwidth of the link corresponding to the metric less an outgoing bandwidth of the link corresponding to the metric.

3. The method of claim 1 wherein each the traffic flow values represent a percentage of the traffic from the source node to the destination node to be route via an associated link.

4. The method of claim 3 wherein the step of routing the traffic comprises generating a routing table for channeling network traffic from the source node to the destination node via links coupled to the source node according to the percentages represented by the traffic values associated with the respective links coupled to the source node.

5. The method of claim 1 wherein each metric includes a magnitude component comprising a bandwidth value of a corresponding link.

6. The method of claim 1 wherein each metric is modulated by a dynamic load scalar indicative of the effective bandwidth of the corresponding link.

7. A method comprising:
   determining a set of metrics for a corresponding set of links within a network;
   performing a linear optimization utilizing the set of metrics to determine respective traffic flow values for links coupling a source node and a destination node within the network, the performing of the linear optimization operation comprises generating a flow matrix populated by the metrics for the set of links, the flow matrix represents a plurality of equilibrium equations for a set of nodes within the network; and
   routing traffic within the network according to the traffic flow values.

8. The method of claim 7 wherein the step of generating the flow matrix comprises the step of inserting a diagonal value into each row of the matrix, each diagonal value including a negative sum of all metrics included within a respective row.

9. The method of claim 7 wherein the step of performing the linear optimization operation comprises the step of performing a routing analysis for a plurality of source and destination node pairs within the network.

10. The method of claim 9 wherein each routing analysis is performed on a network device comprising the source node.

11. A method comprising:
    determining a set of metrics for a corresponding set of links within a network;
    performing a linear optimization utilizing the set of metrics to determine respective traffic flow values for links coupling a source node and a destination node within the network the performing of the linear optimization operation comprises generating a flow matrix populated by the metrics for the set of links by inserting an additional N+1th column into the flow matrix comprising null values.

12. The method of claim 11 wherein the step of performing the linear optimization operation comprises swapping a column associated with the source node and the N+1th column within the flow matrix.

13. The method of claim 12, wherein the step of performing the linear optimization operation comprises negating the column associated with the source node for the swapping.

14. The method of claim 13 wherein the step of performing the linear optimization operation comprises solving an equation $I=V*F$ for I, where I is a routing matrix indicating available bandwidth of each link, F is the flow matrix, and V is a potential difference matrix.

15. The method of claim 14 wherein the step of performing the linear optimization operation comprises normalizing the routing matrix to generate a probability matrix.

16. A network device configured to route network traffic as determined by a linear optimization operation performed utilizing a set of metrics, corresponding to a set of links within a network, each metric of the set of metrics includes a phase component comprising at most a sum of bandwidth values of links feeding into a node comprising an input end-point for the link corresponding to the metric, divided by the outgoing bandwidth of the corresponding link.

17. The network device of claim 16 wherein the set of metrics is manipulated during the linear optimization operation as a reduced matrix comprising only those metrics for links of the network coupled to the network device.

18. A network comprising a plurality of network devices, wherein each network device is configured to route network traffic as determined by a linear optimization operation performed utilizing a set of metrics, corresponding to a set of links within the network, wherein the network performing a linear optimization operation comprises generating a flow matrix populated by the metrics for the set of links, the flow matrix represents a plurality of equilibrium equations for a set of nodes within the network.

19. The network of claim 18 wherein each set of metrics is manipulated during the linear optimization operation as a reduced matrix comprising only those metrics for links of the network coupled to the network device.

20. Apparatus for routing traffic within a network including a plurality of nodes coupled by links, the apparatus comprising:
    a processor to perform a linear optimization operation utilizing a set of metrics, corresponding to a set of links within the network, to determine respective traffic flow values for links coupling a source and destination node within the network, each metric of the set of metrics includes a phase component comprising a sum of bandwidth values of links feeding into a node comprising an input end-point for the link corresponding to the metric, divided by the outgoing bandwidth of the corresponding link; and
    a router to route traffic within the network according to the traffic flow values.

21. The apparatus of claim 20 wherein each the traffic flow values represent a percentage of the traffic from the source node to the destination node to be routed via an associated link.

22. The apparatus of claim 21 including a memory to store a routing table for channeling network traffic from the source node to the destination node via links coupled to the source node according to the percentages represented by the traffic values associated with the links coupled to the source node.

23. The apparatus of claim 20 wherein the processor modulates each metric with a dynamic load scalar value indicative of the effective bandwidth of the corresponding link.

24. The apparatus of claim 20 wherein the router comprises a switch, routing switch or switching router.

25. The apparatus of claim 20 wherein the apparatus comprises a switching system product.

26. The apparatus of claim 20 wherein the apparatus comprises a transmissions system product.

27. A machine-readable medium embodying a plurality of instructions that, when executed by a machine, cause the machine to perform the steps of:
   (a) performing a linear optimization operation utilizing a set of metrics, corresponding to a set of links within a network, to determine respective traffic flow values for links coupling a source node and a destination node within the network each metric of the set of metrics includes a phase component comprising a sum of bandwidth values of links feeding into a node comprising an input end-point for the link corresponding to the metric, divided by the outgoing bandwidth of the corresponding link; and
   (b) routing traffic within the network according to the traffic flow values.

28. A method comprising:

determining a set of metrics for a corresponding set of links within a network, each metric including a phase component that comprises the sum of incoming bandwidth values of links feeding into a node comprising an input end-point for the link corresponding to the metric, divided by the outgoing bandwidth of the corresponding link;

performing a linear optimization utilizing the set of metrics to determine respective traffic flow values for links coupling a source node and a destination node within the network; and routing traffic within the network according to the traffic flow values.

* * * * *